United States Patent [19]
Berg

[11] 3,809,122
[45] May 7, 1974

[54] HYDRAULIC COUPLING
[75] Inventor: David A. Berg, Milwaukee, Wis.
[73] Assignee: Allis-Chalmers Corporation, Milwaukee, Wis.
[22] Filed: Nov. 2, 1972
[21] Appl. No.: 303,283

[52] U.S. Cl. .......................... 137/614.06, 251/149.9
[51] Int. Cl. ............................................. F16l 37/22
[58] Field of Search.......... 137/614, 614.01, 614.02, 137/614.03, 614.04, 614.05, 614.06; 251/149, 149.1, 149.6, 149.9

[56] References Cited
UNITED STATES PATENTS

| | | |
|---|---|---|
| 3,301,272 | 1/1967 | Pettyjohn et al............... 137/614.06 |
| 3,664,634 | 5/1972 | Guertin et al............. 137/614.06 X |
| 3,680,591 | 8/1972 | Vik................... 137/614.05 |
| 3,367,366 | 2/1968 | Oliveau et al............. 137/614.06 X |
| 3,710,823 | 1/1973 | Vik............. 137/614.06 X |
| 3,163,178 | 12/1964 | Stratman...................... 137/614 |
| 2,958,544 | 11/1960 | Wurzburger et al........... 137/614.03 |
| 3,097,867 | 7/1963 | Saloum ....................... 137/614.03 X |
| 2,854,259 | 9/1958 | Clark.................... 137/614.03 |

*Primary Examiner*—William R. Cline
*Assistant Examiner*—Ira S. Lazarus
*Attorney, Agent, or Firm*—Arthur L. Nelson

[57] ABSTRACT

A fluid coupling having a quick disconnecting means with automatic valving to simultaneously terminate and initiate fluid flow in the coupling.

10 Claims, 5 Drawing Figures

PATENTED MAY 7 1974
3,809,122
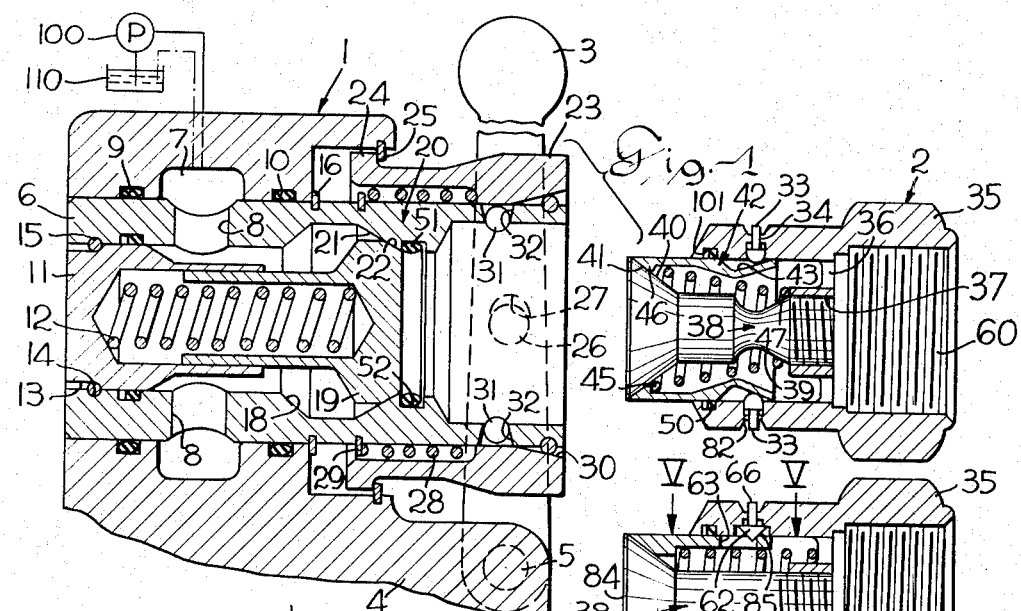
Fig. 1
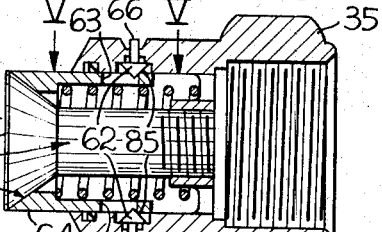
Fig. 4
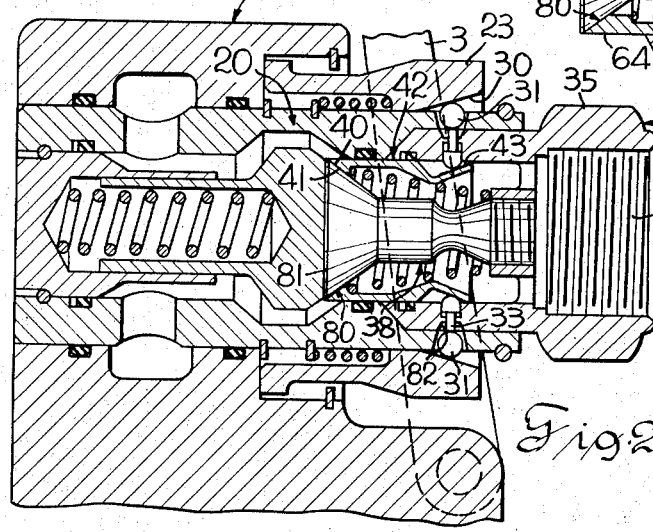
Fig. 2
Fig. 5
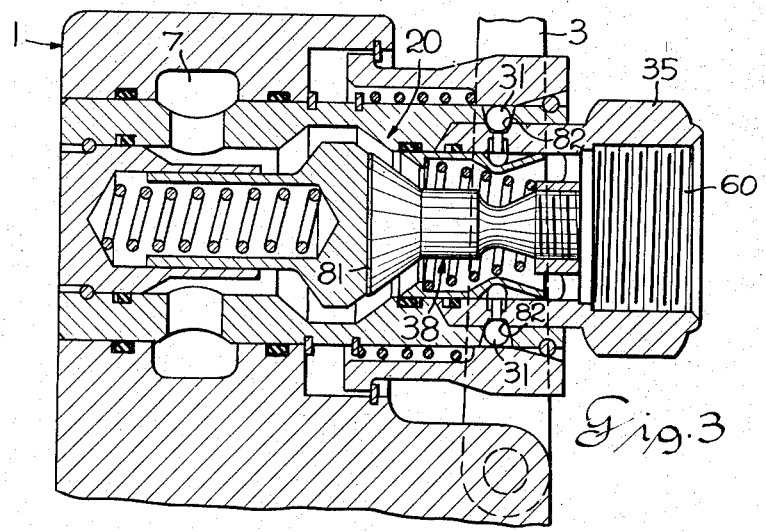
Fig. 3

HYDRAULIC COUPLING

This invention relates to a releasable fluid coupling and more particularly to a quick connecting and disconnecting means of the coupling with associated internal valving to automatically terminate and initiate fluid flow with the disconnecting and connecting of the coupling.

Hydraulic fluid lines are used quite extensively on draft vehicles to operate auxiliary equipment. The fluid lines are often extended from the draft vehicle to the implement for hydraulic control and operation of the implement. On occasions, however, the hydraulic line must be broken by a separating force on the coupling due to disconnection of the implement from the vehicle. The decoupling of the hydraulic line may be done manually as well as automatically, when the implement and draft vehicle are separated. In any event, decoupling of the coupling is a necessary part of the hydraulic system.

An inherent problem of decoupling a hydraulic line is in the loss of hydraulic fluid from the system which requires replenishing of the fluid at frequent intervals and also the fact that hydraulic fluid which is spilled on portions of the draft vehicle and the implement become messy and tend to collect dirt and dust. Accordingly, a coupling which prevents spilling hydraulic fluid while coupling and decoupling in the hydraulic line is desirable.

It is an object of this invention to provide fluid coupling with internal valving operating automatically when the coupling is coupled or decoupled.

It is another object of this invention to provide a fluid coupling in a hydraulic fluid line having a manual decoupling means as well as an automatic decoupling means operating in response to a tensile force applied on the coupling and having internal valving which prevents spilling hydraulic fluid during decoupling of the coupling.

It is a further object of this invention to provide a hydraulic fluid coupling between a tractor and implement for quick disconnecting and connecting of the coupling with automatically operating internal valving to prevent loss of fluid in the process.

The objects of this invention are accomplished by providing a socket section and a complementary plug section received internally in the socket section. Each section has a valve which automatically closes preventing hydraulic fluid from spilling from the coupling when the coupling is disconnected or connected. The internal valving operates to initially dispel hydraulic fluid from the valve area as the valves close during decoupling and then when the valves in each section are closed, the sections separate. Accordingly, no fluid is present on the external side of each of the valves when the coupling is disconnected and no fluid is spilled during the process of connecting and disconnecting the coupling.

Referring to the drawings,

FIG. 1 illustrates the preferred embodiment of the coupling disconnected.

FIG. 2 illustrates the coupling in the partially connected position.

FIG. 3 illustrates the coupling in the fully connected position.

FIG. 4 illustrates a modification of the complementary internal section for reception within the supporting socket section.

FIG. 5 is a fragmentary view taken on line V—V of FIG. 4 illustrating the cammed surface operating the latching means.

Referring to FIG. 1, the socket section 1 is positioned in axial alignment and disconnected from the complementary internal section 2. The socket section includes a lever 3 pivotally mounted in the housing 4 by means of a pin 5. The housing 4 generally supports the casing 6. The housing 4 defines the annular recess 7 which receives pressurized fluid from a pump 100 in the high pressure line. If the coupling is used in the return line recess 7 is connected to sump 110. The annular recess 7 is in communication with the radial bore 8. The O-rings 9 and 10 seal the adjoining surfaces of the housing 4 and casing 6 axially from the annular recess 7.

The casing 6 receives the spring retainer 11 which carries the spring 12. The spring 12 normally biases the spring retainer 11 in a left hand direction. The spring retainer is formed with annular recess 13 while the casing 6 is formed with the annular recess 14. Both recesses 13 and 14 partially receive the ring 15 which carries the thrust load of spring retainer 11 as shown. The axial movement of casing 6 is limited by the snap ring 16 engaging the housing 4.

The spring retainer 11 extends axially through a central opening 18 to slidably receive the valve plunger 19. The valve plunger 19 forms a valve with the casing 6. The conical surface 21 of the casing 6 engages a complementary conical surface 22 of the plunger 19. The valve is shown in the closed position in FIG. 1 with the coupling disconnected.

The control sleeve 23 extends around the periphery of the casing 6 on the right hand end. The control sleeve 23 has a radial flange 24 which engages the snap ring 25 on the housing 4. The casing movement can be controlled by the lever 3 having a pin 26 received in an elongated opening 27. As the lever is pivoted in a counterclockwise direction, the sleeve is moved against the biasing force of the spring 28, which in turn engages the snap ring 29 in an annular groove on the outer periphery of the casing 6.

The control sleeve 23 has a cammed surface 30 on its inner periphery on the right hand end to operate the latching means. The latching means consists of a plurality of spherical elements 31 received in radial ports 32 of the casing 6. The plurality of spherical elements 31 engage the latch pins 33 which extend through the radial openings 34 in the tubular fitting 35 of the complementary internal section 2.

Tubular fitting 35 forms radial supporting spokes 36 integral with the central support 37 for supporting the valve stem 38. The valve stem 38 is formed with an annular recess 39 to facilitate flow through the valve. The stem also forms a conical surface 40. The valve stem 38 is fixed relative to the tubular fitting 35. The conical surface 40 engages the complementary mating valve seat 41 of the valve sleeve 42. The valve sleeve 42 forms a cammed surface 43 on its external periphery which causes the sleeve 42 to move axially to the right when the latch pins 33 are pressed inwardly responsive to the pressure on the spherical elements 31 of the socket section 1. The spring 45 is positioned between a flange 46 of the sleeve 42 and the spring seat 47 on the central support of the tubular fitting 35.

O-ring 50 is placed in an inner peripheral groove 101 of the tubular fitting 35 to form a seal between the valve sleeve 42 and the tubular fitting 35. Similarly, a seal ring 51 is formed in annular recess 52 of the casing 6 for sealing on the external periphery of the valve sleeve 42.

Referring to FIG. 2, the lever 3 is rotated in a counterclockwise direction permitting the spherical elements 31 to ride up on the cammed surface 30 allowing the valve sleeve 42 to shift in the left hand direction with valve seat 41 engaging the conical surface 40 on the valve stem 38.

FIG. 3 illustrates the coupling connected in the operating position in which the fluid flow passes from the annulus 7 in the right hand direction through the coupling to the outlet passage 60.

FIG. 4 illustrates a modification of the complementary section 2 in which the tubular fitting 35 is seated with latch pins 62 having a conical lower surface. The conical portions of the latch pins 62 engage a teardrop-shaped opening 63. The teardrop-shaped opening 63 is more clearly shown in FIG. 5. The conical surfaces 85 engage the opening and allow the latch pins 62 to move radially inward into the opening and retract the valve sleeve 64 as the coupling is connected. The force on the radially outer portion of the latch pins 62 by engagement of the surfaces 66 with the spherical elements 31 causes a retracting of the sleeve 64 and opening of the valve as the complementary internal section 61 is inserted into the socket section 1.

The operation of the coupling operates in the following described manner. Considering the coupling in the disconnected position, as shown in FIG. 1, the lever 3 is rotated in a counterclockwise direction, as shown in FIG. 2. As the lever 3 is rotated in a counterclockwise direction, the control sleeve 23 slides axially to the position as shown. This permits the latch pin 33 to move radially outward biasing the spherical elements 31 against the cammed surface 30 of the control sleeve 23 as they engage the inclined surface 43 on the tubular fitting 42. With the pins forcing spherical elements 31 outwardly against the cammed surface 30 the latch pins 33 ride over the cammed surface 43.

As the complementary internal section 2 is fully inserted within the external socket section 1, the spherical elements 31 become aligned radially with the latch elements 33. In this position the lever 3 is permitted to rotate in the clockwise direction as the cammed surface 30 slides over the spherical elements 31. This produces a radially inward force on the latch pin 31 which is pressed downwardly onto the cammed surface 43. The inclination of the surface 43 causes the valve sleeve 42 to move in the axially right hand direction opening the valve 80 in the internal section 35. The valve 20 is opened due to the axial force of the end surface 81 of the valve stem 38. Accordingly, both valves are opened to permit the flow of fluid through the coupling. As the lever 3 is fully rotated to the position shown in FIG. 3, the coupling is locked since the spherical elements 31 seat in the annular recess 82 and prevent the internal section 35 from moving axially from the socket section 1.

FIG. 4 illustrates a modification wherein the latch pins 62 have heads which are formed with conical surfaces 85 which slide in and out of the teardrop opening 63. As the conical surfaces 85 engage the narrow portion of the teardrop opening 63, they force the sleeve 64 in the right hand direction causing an opening of the valve 80 at the end of the valve stem 38 thereby opening the valve 20 in the socket section of the coupling. The operation is similar to that described in a preferred embodiment in this invention.

When it is desired to decouple the coupler, the lever 3 is again rotated in a counterclockwise direction permitting spherical elements 31 to move radially outward within the openings 32. As the spherical elements 31 move outwardly in response to the spring 45 pressing the sleeve 42 in a left hand direction, the latch pins 33 move radially outward forcing the balls in the radially outward position, as shown in FIG. 2 until the spherical elements 31 are completely removed from the annular recess 82 and the internal section 2 is permitted to move in the right hand direction. In this position both of the valves 20 and 80 are closed. The valve sleeve 42 engages the conical surface 40 of the valve stem 38 while the plunger 19 moves in the right hand direction to engage the casing as the internal section 2 is removed from the socket section 1.

When the coupling is disconnected automatically the internal section 2 is placed under a tensile force tending to withdraw it from the socket section 1. The casing 6 of the socket section slides within the housing 4 as the casing and the internal section 2 forming the valve 20 and the valve 80 move in a right hand direction. This movement is permitted until the spherical elements 31 ride up on the cammed surface 30 permitting a radial movement of the spherical elements 31 relative to the internal section 2. With a radial movement of the spherical elements 31, the latch elements also are permitted to move radially. This in turn allows the spring 45 to move the sleeve 42 in the left hand direction. The plunger 19 closes by engaging surface 21 closing valve 20 while the valve 80 closes when the valve seat of the sleeve is permitted to engage the conical surface 40. When a sufficient radial movement of the spherical elements 31 and the latch pins 34 is permitted, the coupler automatically disconnects and at which point both valves 20 and 80 are closed and no hydraulic fluid is permitted to spill from the coupling.

Accordingly, it is understood that the force required to uncouple the coupler is dependent on the inclination of the cammed surface 30 on the control sleeve 23 and the inclination of the cammed surface 43 on the valve sleeve 42. These, of course, are design characteristics for providing the force desired for coupling and decoupling and external force required to automatically disconnect the coupler.

The embodiments of the invention in which an exclusive property or privilege is claimed are defined as follows:

1. A hydraulic coupling comprising, a socket section defining a socket for receptive engagement with a complementary internal section, said socket section including a tubular housing defining a converging valve seat on the inner periphery of said tubular housing and adapted for connection to a fluid line, a valve element forming a first valve with said valve seat, resilient means biasing said valve element axially toward the socket to engage said valve seat when said coupling is disconnected, said complementary internal section including a sleeve for reception within the socket of said tubular housing, a valve stem fixed centrally to said sleeve engaging said valve element of said socket section to bias the valve of said socket section to an open position when said coupling is assembled, a shoulder defining a valve surface on said valve stem, a valve component defining a cammed surface slidably mounted within said sleeve, spring means resiliently biasing said valve component for engagement with said valve surface on said valve stem to form a second valve, a latching means normally holding said valve component in spaced relation to said valve surface on said shoulder when said coupling is connected, a control sleeve having a cammed surface for releasing said latching means when said coupling is disconnected and for locking said latching means when said coupling is connected.

2. A hydraulic coupling as set forth in claim 1 wherein said valve element and said valve seat of said socket section define a valve on the high pressure side of said component, said shoulder on said valve stem and said valve sleeve define a valve on the low pressure side of said coupling.

3. A hydraulic coupling as set forth in claim 1 wherein said valve seat on said housing and said valve component define adjacent conical surfaces when said valves are in the open position.

4. A hydraulic coupling as set forth in claim 1 wherein said valve stem defines a conical surface said valve component defines a mating conical surface for engaging said valve stem.

5. A hydraulic coupling as set forth in claim 1 including said control sleeve defining a cammed surface, means biasing said control sleeve to a locking position for locking said latching means with said complementary internal section in said socket section whereby external forces applied tending to decouple said coupling permit said latching means to operate against said cam means on said control sleeve to automatically unlatch said coupling.

6. A hydraulic coupling as set forth in claim 1 wherein said latching means includes radially operated latching means, a cammed surface on said valve component engaging said latching means for biasing said valve component to a retracted position for opening said second valve when said control sleeve is moved in a first direction, said cammed surface on said control sleeve and said latching means permitting said valve component to move to an engaging position with said valve stem to thereby close said second valve when said control sleeve is moved in a second direction.

7. A hydraulic coupler as set forth in claim 1 including a lever pivotally mounted on said socket section and pivotally connected to said control sleeve for manually disconnecting said coupling.

8. A hydraulic coupling as set forth in claim 1 wherein said valve element and said valve seat define said first valve in the socket section, said valve component and said valve stem define said second valve in the complementary internal section, said valve stem thereby operating said first valve while said latch means controls operation of said second valve to simultaneously close said valves when said coupling is disconnected.

9. A hydraulic coupling as set forth in claim 1 wherein said latching means includes a plurality of latch elements, a cammed surface on said control sleeve for engaging said latch elements, a plurality of cammed surfaces on said valve component for engaging said latch elements, said control sleeve thereby operating said latch elements for controlling said second valve when said control sleeve is operated.

10. A hydraulic coupling as set forth in claim 1 wherein said socket section defines a cylindrical opening for receiving said complementary internal section, said valve component of said complementary internal section defining a cylindrical surface, sealing means on the internal periphery of said cylindrical opening for sealing said valve component with said socket section, as said coupling is connected and disconnected.

* * * * *

PO-1050
(5/69)

UNITED STATES PATENT OFFICE
CERTIFICATE OF CORRECTION

Patent No. 3,809,122      Dated May 7, 1974

Inventor(s) David A. Berg

It is certified that error appears in the above-identified patent and that said Letters Patent are hereby corrected as shown below:

Column 5, Claim 2, line 5, "sleeve" should be --- component ---.

Signed and sealed this 1st day of October 1974.

(SEAL)
Attest:

McCOY M. GIBSON JR.
Attesting Officer

C. MARSHALL DANN
Commissioner of Patents